US007206789B2

(12) United States Patent
Hurmiz et al.

(10) Patent No.: US 7,206,789 B2
(45) Date of Patent: Apr. 17, 2007

(54) SYSTEM AND METHOD FOR DEFINING AND COLLECTING DATA IN AN INFORMATION MANAGEMENT SYSTEM HAVING A SHARED DATABASE

(75) Inventors: Charles Samuel Hurmiz, Arlington, TN (US); Peter David Hunsberger, Memphis, TN (US); Rajani Kala Kothapali, Cordova, TN (US); Xingyan Zhao, Memphis, TN (US)

(73) Assignee: St. Jude Children's Research Hospital, Inc., Memphis, TN (US)

( * ) Notice: Subject to any disclaimer, the term of this patent is extended or adjusted under 35 U.S.C. 154(b) by 511 days.

(21) Appl. No.: 10/705,922

(22) Filed: Nov. 13, 2003

(65) Prior Publication Data

US 2005/0108271 A1    May 19, 2005

(51) Int. Cl.
*G06F 17/00* (2006.01)
*G06F 7/00* (2006.01)
(52) U.S. Cl. ............................... 707/102; 707/1; 707/8
(58) Field of Classification Search ................ 707/1–4, 707/10, 100–103 R, 200, 104, 104.1; 709/203, 709/223, 224, 227; 715/505, 513, 501.1
See application file for complete search history.

(56) References Cited

U.S. PATENT DOCUMENTS

| 5,325,478 A | 6/1994 | Shelton et al. |
| 5,606,609 A | 2/1997 | Houser et al. |
| 5,630,117 A * | 5/1997 | Oren et al. ................. 707/100 |
| 5,660,176 A | 8/1997 | Iliff |
| 5,666,490 A | 9/1997 | Gillings et al. |
| 5,737,739 A | 4/1998 | Shirley et al. |
| 5,772,585 A | 6/1998 | Lavin et al. |

(Continued)

FOREIGN PATENT DOCUMENTS

DE     699 03 808 T2     9/2003

(Continued)

OTHER PUBLICATIONS

Harlan, William R., Creating an NIH clinical trials registry: A user-friendly approach to health care, JAMA, Chicago, Jun. 8, 1994, vol. 271, issue 22, start p. 1729.

(Continued)

*Primary Examiner*—Jeffrey Gaffin
*Assistant Examiner*—Jacques Veillard
(74) *Attorney, Agent, or Firm*—Sterne, Kessler, Goldstein & Fox P.L.L.C.

(57) ABSTRACT

A presentation application and database development and management controller, collectively, produce an individual or group-specific, customized interface to a shared database. The presentation application can be template or script driven, and interacts with each client to provide a customized display. In an embodiment, the presentation application communicates with a network server to distribute data to clients over a computer network, such as the global Internet. The database development and management controller interacts with the database and manages the customization and distribution of data to the presentation application. A collection of service objects are built to represent the information stored in the database. A plurality of presentation objects are also provided as abstract representations used to organize and customize the display of the information. As such, one or more service objects are mapped to each presentation object.

26 Claims, 15 Drawing Sheets

U.S. PATENT DOCUMENTS

| | | | |
|---|---|---|---|
| 5,813,009 A | 9/1998 | Johnson et al. | |
| 5,826,237 A | 10/1998 | Macrae et al. | |
| 5,893,109 A | 4/1999 | DeRose et al. | |
| 5,973,731 A | 10/1999 | Schwab | |
| 5,991,731 A | 11/1999 | Colon et al. | |
| 5,997,476 A | 12/1999 | Brown | |
| 6,022,315 A | 2/2000 | Iliff | |
| 6,029,138 A | 2/2000 | Khorasani et al. | |
| 6,058,391 A | 5/2000 | Gardner | |
| 6,108,635 A | 8/2000 | Herren et al. | |
| 6,108,664 A * | 8/2000 | Nori et al. | 707/103 R |
| 6,134,549 A * | 10/2000 | Regnier et al. | 707/9 |
| 6,149,585 A | 11/2000 | Gray | |
| 6,218,122 B1 | 4/2001 | Friend et al. | |
| 6,272,470 B1 * | 8/2001 | Teshima | 705/3 |
| 6,272,506 B1 | 8/2001 | Bell | |
| 6,353,835 B1 * | 3/2002 | Lieuwen | 707/203 |
| 6,415,295 B1 | 7/2002 | Feinberg | |
| 6,496,827 B2 | 12/2002 | Kozam et al. | |
| 6,574,631 B1 | 6/2003 | Subramanian et al. | |
| 6,718,320 B1 * | 4/2004 | Subramanian et al. | 707/2 |
| 6,820,235 B1 | 11/2004 | Bleicher et al. | |
| 6,944,613 B2 * | 9/2005 | Lef et al. | 707/3 |
| 2004/0230592 A1 | 11/2004 | Fischer et al. | |
| 2004/0243439 A1 | 12/2004 | Huggard et al. | |

FOREIGN PATENT DOCUMENTS

| | | |
|---|---|---|
| EP | 1 082 693 B1 | 11/2002 |
| WO | WO 97/44752 | 11/1997 |
| WO | WO 98/12669 | 3/1998 |
| WO | WO 98/39720 | 9/1998 |
| ZA | 981670 | 2/1998 |

OTHER PUBLICATIONS

Van Camp, Ann J., Databases for nurses: Special subjects, Database, Weston, Feb. 1994, vol. 17, issue 1, start p. 103.

Oliver, Dick et al., Netscape Unleashed, 1996 Sams.net Publishing, pp. 118-121, 376-379.

Sauer, F. et al., Multimedia technology in the radiology department, ACM International Multimedia Conference, Oct. 15-20, 1994, pp. 263-269.

Kiuchi, T. et al., "Automated generation of a World Wide Web-based data entry and check program for medical applications," *Computer Methods and Programs in Biomedicine* 52:2 pp. 129-138 (Feb. 1997).

Kelly, M.A. et al., "The Internet and randomised controlled trials," *International Journal of Medical Informatics* 47:1-2 pp. 91-99 (1997).

"Multi-State Button Manipulation using a Single Graphic," *IBM Technical Disclosure Bulletin* 38:4 pp. 585-587 (Apr. 1995).

"Efficient 3D Buttons in Dynamic Hyper Text Markup Language Pages," *IBM Technical Disclosure Bulletin* 41:1 pp. 695-698 (Jan. 1998).

Girgensohn A. et al., "Seamless integration of interactive forms into the Web," *Computer Networks and ISDN Systems* 29:8-13 pp. 1531-1542 (1997).

Netscape Communications Corp.: "NetHelp" Nethelp Release 1.0 SDK Documentation, Online! -Aug. 1996 pp. 1-14 <URI:http://home.netscape.com/eng/help/sdkl/sdksite.html>.

International Search Report for PCT Appl. No. PCT/US2004/035732, mailed Apr. 8, 2005, 7 pages.

Leverenz, L. and Rehfield, D., "Oracle8i, Concepts, Release 8.1.5," Oracle Corporation, 1999, XP002322017, pp. 1-5 and 10-11 through 10-18.

* cited by examiner

SYSTEM AND METHOD FOR DEFINING AND COLLECTING DATA IN AN INFORMATION MANAGEMENT SYSTEM HAVING A SHARED DATABASE

BACKGROUND OF THE INVENTION

1. Field of the Invention

The present invention relates generally to database management, and more specifically, to building data collection structures for a database.

2. Related Art

The demand for an application that can be used to build data collection systems around a variety of business needs is high, and growing steadily. Conventional systems and methods require users to understand programming code to construct or alter physical schema to build a data collection system. A need exists for technology that addresses these concerns that is less labor intensive and less expensive.

SUMMARY OF THE INVENTION

The present invention provides a database development and management tool that enables a user to develop a customized interface to a database within an information management system. Customization can be implemented at an individual or community level. As such, database views can be produced and customized to support different services and/or the diverse needs of a plurality of user communities. The database views include two types of customization. First, a user can customize the data that are being collected and managed to form a logical database from physical database records. Second, a user can customize the presentation of the logical database to support specific needs and/or services.

In an embodiment, the information management system of the present invention includes a presentation application and a database development and management controller, which collectively produce individual or group-specific, customized views from a shared database. The presentation application interacts with each client and provides a customized display. In an embodiment, the presentation application communicates with a network server to distribute data to clients over a computer network, such as the global Internet.

Information collection structures enable the database development and management controller to interact with the shared database and manage the customization and distribution of data to the presentation application, without having to construct or alter the physical schema of the shared database. The database development and management controller builds a collection of service objects, which represent the information stored in the database. A plurality of presentation objects are also provided, and one or more service objects are mapped to each presentation object. The presentation objects are abstract representations used to organize the display of the information, which provides a customized view of the shared database.

In an embodiment, the presentation application is template or script driven to provide synchronization of the procedural code between the presentation objects and the database. The template or script integrates the multiple presentation objects for the customized display to a client.

A security layer is provided to identify system users and authorize exchanges within the information management system. In an embodiment, the security layer enables the creation and authorization of users for access rights at the database level. In another embodiment, the security layer enables the creation of logical users whose access rights are managed through metadata in the database development and management controller.

To support multiple customized interfaces, the present invention uses metadata to manage general entities of a shared database. The metadata determines the fields that a given service must maintain, and allows multiple services to refer to the same data in different ways. In an embodiment, an entity relationship model for managing entities includes an entities table, attributes table, models table, components table, objects table, and object types table. The models table, components table, objects table, and object types table collect metadata, and the entities table and attributes table collect the actual data. The entity relationship model is effective for managing database entities that require a high degree of customization. In an embodiment, an instances table is also included to allow instance-specific metadata to be captured for the object table. An instances table, however, is not required if the presentation application is template-based.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally or structurally similar elements. Additionally, the leftmost digit(s) of a reference number generally identifies the drawing in which the reference number first appears.

DETAILED DESCRIPTION OF THE INVENTION

Figure 1:
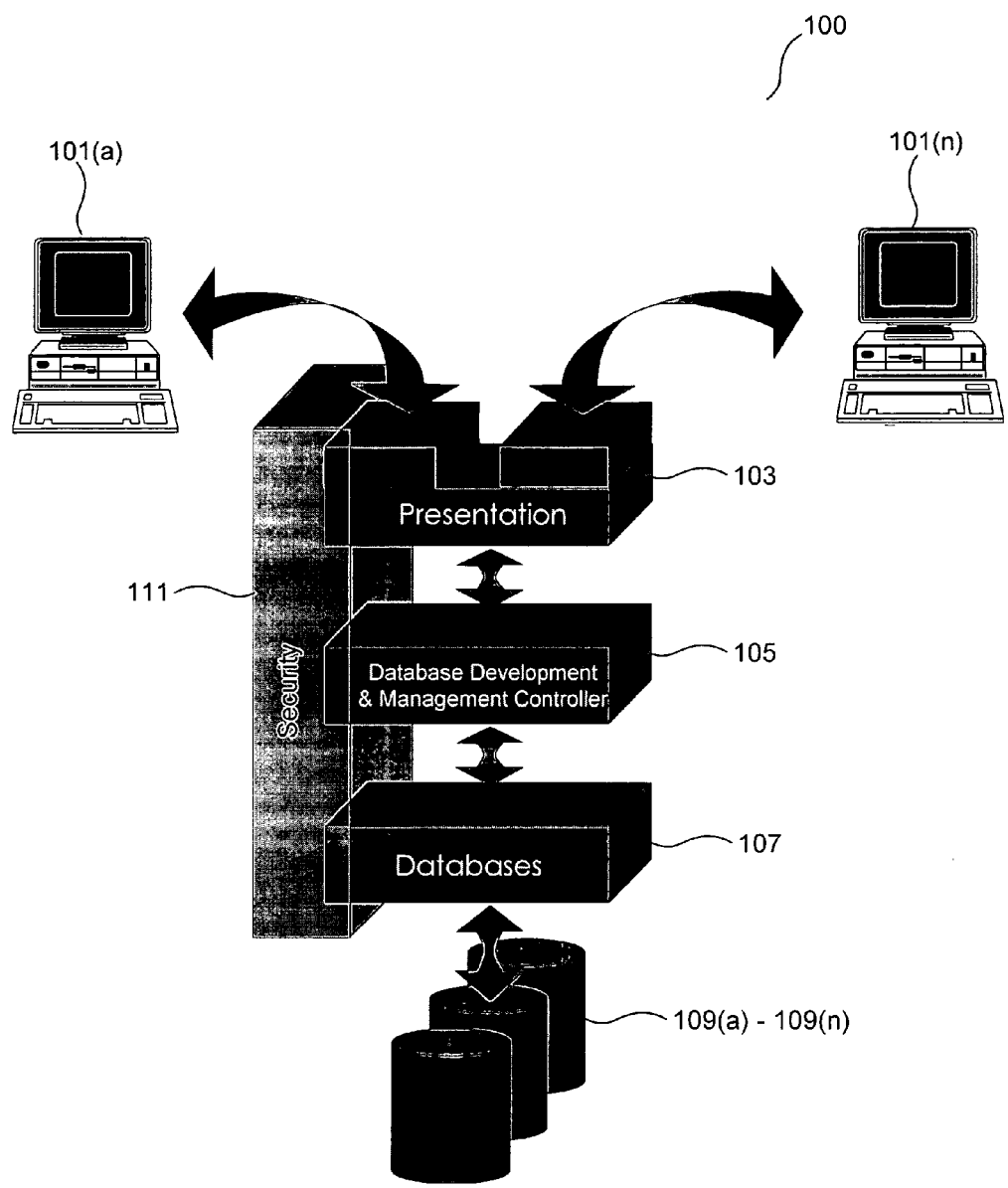
FIG. 1 illustrates an information management system according to an embodiment of the present invention.

The present invention provides a database development and management tool that enables a user to develop a customized interface to a database system. FIG. 1 illustrates an information management system 100 according to an embodiment of the present invention. System 100 includes a presentation application 103 that communicates with one or more clients 101(a)–101(n). System 100 also includes a database development and management controller 105, a database management system 107, and database records 109(a)–109(n).

Database development and management controller 105 manages the interaction among clients 101(a)–101(n) and database management system 107. Database development and management controller 105 also manages the presentation of data to clients 101(a)–101(n) and determines what data can be stored in database records 109(a)–109(n). According to embodiments of the present invention, database development and management controller 105 allows customized views to be produced from database management system 107 and database records 109(a)–109(n). As such, clients 101(a)–101(n) represent a plurality of user communities requiring different services and/or having diverse needs. The views are customizable to support the differing services or needs of the user communities. The present invention, therefore, allows a group of clients 101(a)–101(n) to share a common underlying database (i.e., database management system 107 and database records 109(a)–109(n)) and other components of system 100.

Since system 100 supports different presentation applications 103 for providing different services to clients 101(a)–101(n), database development and management controller 105 comprises procedural logic to encode specific rule behaviors. A database-driven rule selector specifies the rule(s) that apply to a given service. In an embodiment, a system scratch area or blackboard is used to post temporary values for the rules. The temporary values can be referenced by other rules while the input data for the temporary values is being validated, but has not yet been persisted into database records 109(a)–109(n). Using well-defined rule sets that share well-defined scratch area references, database development and management controller 105 creates a facility that allows an end-user (i.e., one of clients 101(a)–101(n)) to define the validation required on an as-needed basis.

In another embodiment, database development and management controller 105 implements mathematical functional programming models to encode relatively large rule sets. The models can be programmed in, for example, LISP, Haskell, or other programming languages. In another embodiment, rules are combined in an ad-hoc manner and dynamically interpreted by a generalized engine.

Data management system 107 is relational or object oriented (OO)/component based. Database management system 107 controls the storing, retrieving, and updating of data and metadata in database records 109(a)–109(n). Database management system 107 also controls data integration, enforces integrity rules and constraints (including data integrity and referential integrity), and enforces security constraints. An Open DataBase Connectivity (ODBC) or Java DataBase Connectivity (JDBC) protocol, or the like, can be provided for direct connection to database records 109(a)–109(n).

Database records 109(a)–109(n) comprise a collection of integrated records used to support system 100. Database records 109(a)–109(n) can be implemented, for example, with the Oracle 8i™ database available from Oracle Corporation (Redwood City, Calif.), the SQL Server 2000 application available from Microsoft Corporation (Redmond, Wash.), or the like.

In an embodiment, each database record 109(a)–109(n) is a separate database. In an embodiment, database management system 107 is coupled to a data warehouse server (not shown). The data warehouse server can be coupled to database management system 107 over a wired or wireless communications infrastructure similar to computer network 210, discussed below with reference to FIG. 2. Data warehousing can be implemented, for example, with the SQL Server 2000 application available from Microsoft Corporation, the Oracle 9i™ database available from Oracle Corporation, or the like.

In an example implementation of the present invention, database records 109(a)–109(n) contain clinical research information. For example, one database record can be dedicated to collecting patient information, including personal and demographic information. A second database record can collect diagnostic information for a corresponding entry in the patient database record. A third database record can collect protocol information for a corresponding entry in the diagnostic database record. A fourth database record can collect therapy information that is tied to the protocol database record and/or the diagnostic database record. A fifth database record can be provided to collect subjective and/or objective observations and other variations. Other database records can be included to collect clinical research information as would be apparent to one skilled in the relevant art(s).

Figure 8:
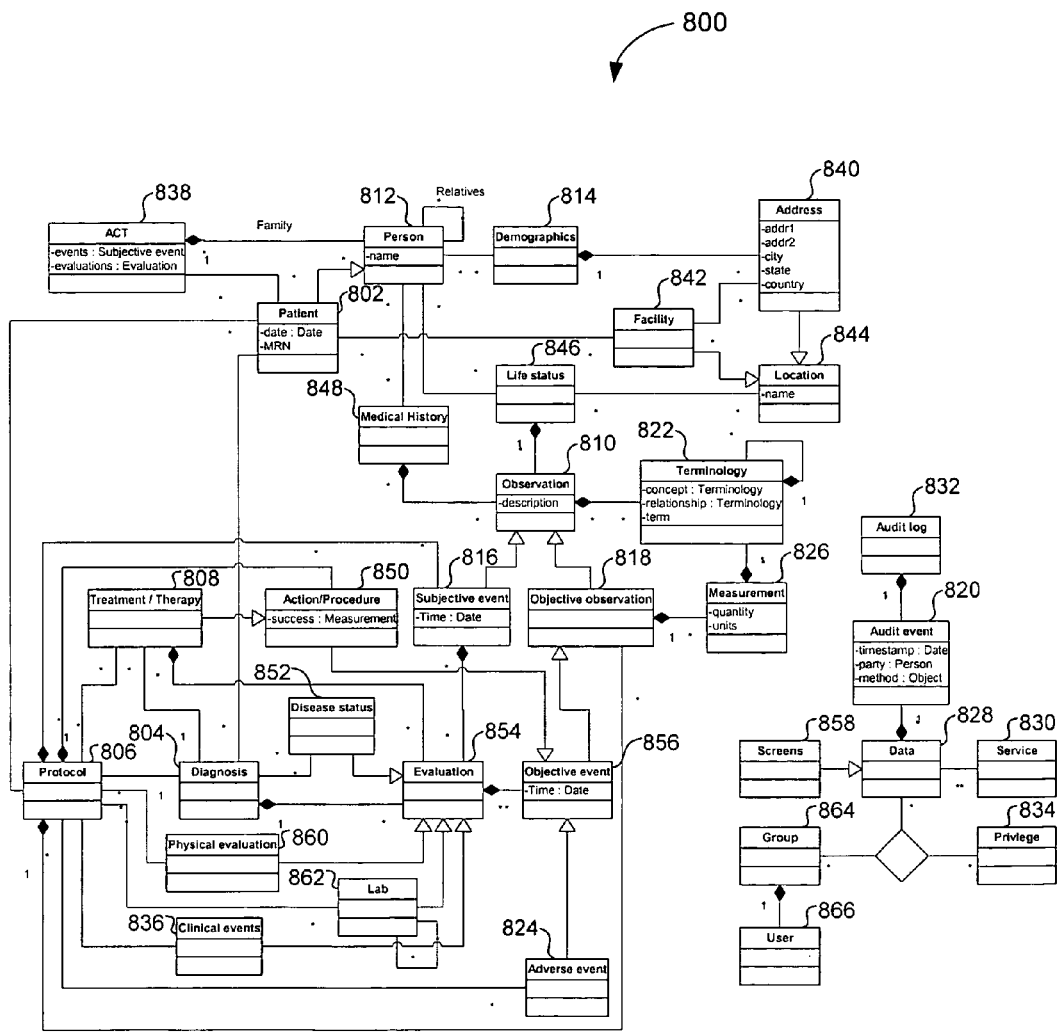
FIG. 8 illustrates a database entity relationship according to an embodiment of the present invention.

FIG. 8 illustrates an entity relationship among the aforementioned "clinical research" database records 109(a)–109(n), according to an embodiment of the present invention. Patient information, as discussed above, is represented by a patient object 802, which includes a direct link to person object 812 and an indirect link to demographic object 814. Also, linked directly to patient object 802 is facility object 842. Address object 840, location object 844, medical history object 848, and life status object 846 collect additional information to further qualify the records of patient object 802. An act object 838 resides at the top of the hierarchy depicted in FIG. 8, and represents all events and evaluations associated with each patient collected at patient object 802.

Diagnostic information, also discussed above, is represented by a diagnosis object 804. The protocol information discussed above is represented by a protocol object 806, and the therapy information discussed above is represented by a treatment/therapy object 808. Treatment/therapy object 808 includes links to protocol object 806, diagnosis object 804, evaluation object 854, and action/procedure object 850. Protocol object 806 includes links to patient object 802, action/procedure object 850, lab object 862, clinical events object 836, physical evaluation object 860, diagnosis object 804, subjective event object 816, adverse event object 824, and objective observation object 818. Diagnosis object 804 includes links to patient object 802, disease status object 852, and evaluation object 854.

The observation information discussed above is represented by an observation object 810, which includes a link to a subjective event object 816 representing subjective information, and a link to an objective observation object 818 representing objective information. Objective observation object 818 includes links to objective event object 856 and measurement object 826. Measurement object 826 is linked to terminology object 822. Terminology object 822 includes generic and industry-specific definitions, and is linked to observation object 810 and measurement object 826.

The relationships shown in FIG. 8 form the basis for business logic that is deployed by the present invention. For example, an "event" is a specific form of an observation, as shown by observation object 810. An adverse event (shown by adverse event object 824) is a specific form of the more general "event." Similarly, an objective observation (shown by objective observation object 818) is a specific form of observation that aggregates measurements (shown by measurement object 826), and a measurement (i.e., measurement object 826) is an aggregation of terminology units (shown by terminology object 822) combined with numerical quantities.

Data object 828 represents a base class of objects that can be used to extend all other classes of objects. Data object 828 provides a base implementation of services (shown by service object 830), audit logging (shown by audit log object 832 and audit event object 820), and data access authorization management (shown by privilege object 834). Screens object 858 supports generic and customized user interfaces for data object 828. User object 866 and group object 864 represent individual and group, respectively, identification and demographic information and support data access authorization.

The present invention is not limited to managing clinical research data as depicted in FIG. 8. In another embodiment, database records 109(*a*)–109(*n*) of FIG. 1 contain basic research information. For example, the database records can store information related to samples of human tissue, DNA combinatorial libraries, pharmaceutical experimentation, or the like. While the above is a representative list of different types of information that can be managed using the present invention, it should be understood that any type of information can be managed using the present invention and is included within the scope of the invention.

Referring back to FIG. 2, system 100 implements a security layer (via security agent 111) to identify system users and authorize exchanges within system 100. Security agent 111 coordinates with various system components to protect user access, data, and communications within system 100. In an embodiment, user authentication (e.g., username/password; fingerprint, retina or facial identification; or the like) is a prerequisite to receiving information from system 100. User authentication is used to determine database access, roles, restrictions, security level, and functions. For example, database access controls whether a user can read, write, or update database records 109(*a*)–109(*n*). As such, security agent 111 protects the integrity of system 100, system data, users, and system availability. Security agent 111 audits all updates and changes to data stored within system 100.

In an embodiment, security agent 111 enables the creation and authorization of users for access rights at the database level (e.g., database management system 107, and/or database records 109(*a*)–109(*n*)). In another embodiment, security agent 111 enables the creation of logical users whose access rights are managed through metadata in database development and management controller 105. Logical user rights are not database specific and are more flexible and portable than defining user rights at the database level. System 100 provides not only application reusability, but also a single source of data among multiple system components (e.g., clients 101(*a*)–101(*n*)) while securely managing the data.

Figure 2:
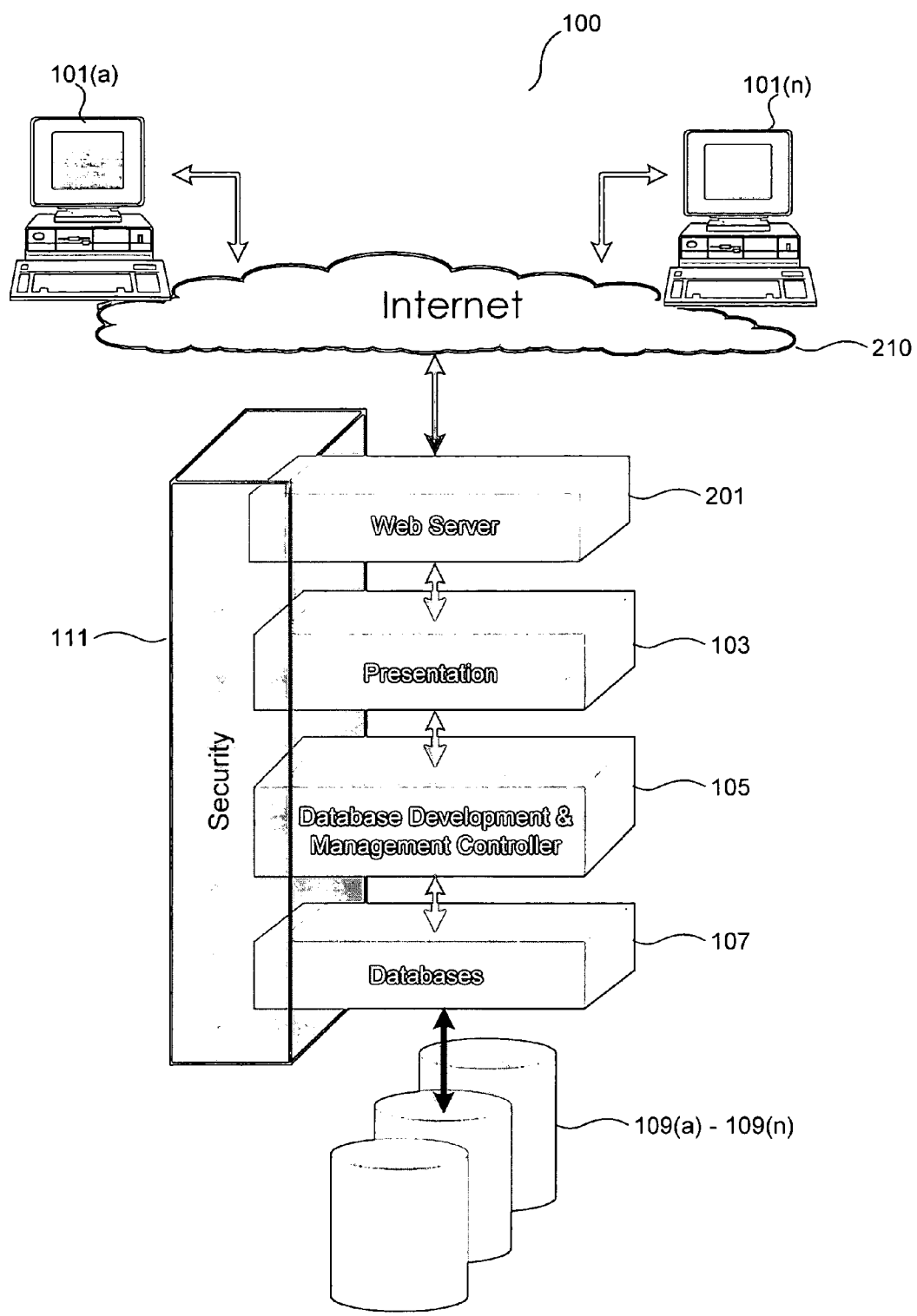
FIG. 2 illustrates an information management system according to another embodiment of the present invention.

FIG. 2 illustrates another embodiment of information management system 100. In this embodiment, each client 101(*a*)–100(*n*) and network server 201 exchanges communications over a diverse computer network 210. Computer network 210 includes a wired, wireless, or combination of a wired and wireless local area network (LAN), wide area network (WAN), metropolitan area network (MAN), and/or optical network (such as, an organization's intranet, a local internet, a global computer network (e.g., the Internet, including the World-Wide Web (WWW)), virtual private networks, and/or the like.

In an embodiment, network server 201 implements the Windows NT® Internet Information Services architecture that is available from Microsoft Corporation (Redmond, Wash.). Network server 201 includes a sessions controller (not shown) that manages all online sessions with each client 101(*a*)–101(*n*) over computer network 210. In an embodiment, the sessions controller is part of a multithreaded Java application that manages the sessions with each client 101(*a*)–101(*n*) through a unique socket. Therefore, each client 101(*a*)–101(*n*) would be a thread in a Java application on network server 201. As would be apparent to one skilled in the relevant art(s), other programming languages, such as Java, C, C++, or the like, can be used to implement the functions of the session controller or the other components of network server 201. In an embodiment, the session controller uses the Apache Tomcat Servlet container (available from the Apache Jakarta Project at http://jakarta.apache.org). In other embodiments, the session controller uses the J2EE platform architecture available from the JBOSS Group LLC (Atlanta, Ga.), the WEBSPHERE® architecture available from IBM Corporation (White Plains, N.Y.), or the Weblogic architecture available from BEA Systems, Inc. (San Jose, Calif.). In an embodiment, interfaces to external systems are encapsulated as enterprise beans deployed on, for example a J2EE-compliant server.

Presentation application 103 and/or network server 201 is adaptable to support various system configurations and data formats, thus enabling system 100 to interact with differing communication interfaces. As such, presentation application 103 and/or network server 201 has the capability to read and/or format data for compatibility with each client 101(*a*)–101(*n*). For example, the data can be configured to support various operating systems, such as, the NETWARE™ systems available from Novell, Inc. (Provo, Utah); the LINUXS systems available from Linux Online Inc. (Ogdensburg, N.Y.); the SOLARIS™ systems available from Sun Microsystems, Inc. (Santa Clara, Calif.); or the like. The data can be configured to support the NETSCAPE® or MICROSOFT® browsers capable of handling Java 1.1 or higher, JavaScript, or the like; or the HyperText Markup Language (HTML) (including XHTML), Extensible Markup Language (XML), or Synchronized Multimedia Integration Language (SMIL) scripting languages; or the like as would be apparent to one skilled in the relevant art(s).

Security agent 111 interacts with network server 201 to protect user access, data, and communications within system 100. In an embodiment, a Secure Sockets Layer (SSL) provides a secure data path for all communications. Access to any resource within network server 201 can also be controlled by firewalls, encryption, user authentication, or like security techniques, as would be apparent to one skilled in the relevant art(s).

Network server 201 represents one or more computers providing various shared resources with each other and to the other system computers. The shared resources include files for programs, web pages, databases and libraries; output devices, such as, printers or plotters; and communications devices, such as modems and Internet access facilities. The communications devices support wired, wireless, or both transmission media, including satellite, terrestrial (e.g., fiber optic, copper, twisted pair, coaxial, hybrid fiber-coaxial (HFC), or the like), radio, microwave, free space optics (FSO), and/or any other form or method of transmission. Network server 201 is configured to support the standard Internet Protocol (IP) developed to govern communications over public and private Internet backbones. The protocol is defined in Internet Standard (STD) 5, Request for Comments (RFC) 791, by the Internet Engineering Task Force (IETF). Each server can also support transport protocols, such as, Transmission Control Protocol (TCP), User Datagram Protocol (UDP), or Real Time Transport Protocol (RTP).

Clients 101(a)–101(n) can be a personal computer, personal digital assistant (PDA), telephone, television, or like processing devices coupled to presentation application 103 and/or network server 201, and including a display device with the ability to request and receive information from system 100. The display device for each client 101(a)–101(n) provides a text or graphical user interface (GUI) and enables graphical controls corresponding to various commands to presentation application 103 and/or network server 201.

Figure 3:
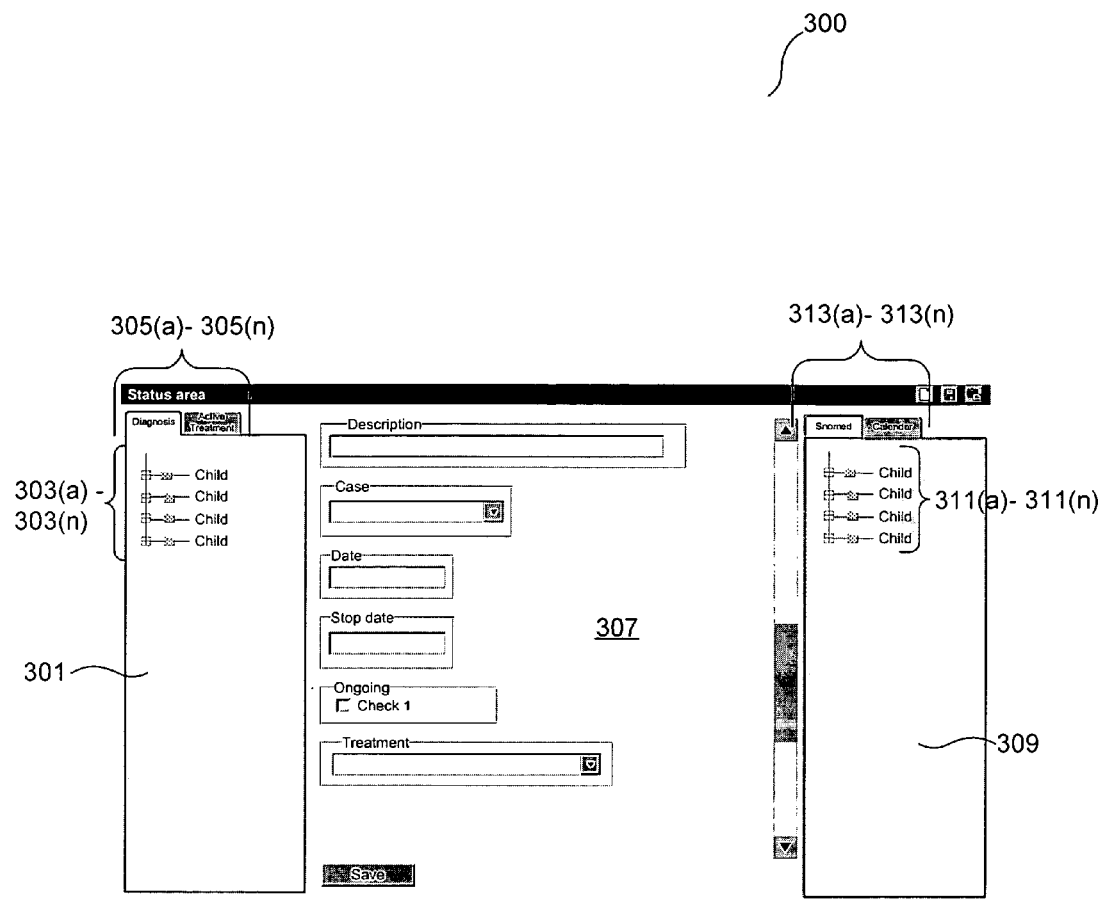
FIG. 3 illustrates a client interface according to an embodiment of the present invention.

FIG. 3 illustrates a representative embodiment of a client interface 300 according to the present invention. Client interface 300 is produced by presentation application 103 and displayed on a client 101(a)–101(n). Client interface 300 includes a navigation area 301, which is broken down into major categories using folder metaphors 303(a)–303(n) and tab metaphors 305(a)–305(n). Main work area 307 is positioned in the center of client interface 300. Main work area 307 enables context specific actions to be taken. Data lookup area 309 is located on the right of client interface 300, and is broken down into major categories using folder metaphors 311(a)–311(n) and tab folders 313(a)–313(n). Folder metaphors 303(a)–303(n) and folder metaphors 311(a)–311(n) use a tree model with collapsible or expandable tree components. Navigation area 301 and data lookup area 309 can be resized to compare large quantities of data points across multiple selections.

Figure 4:
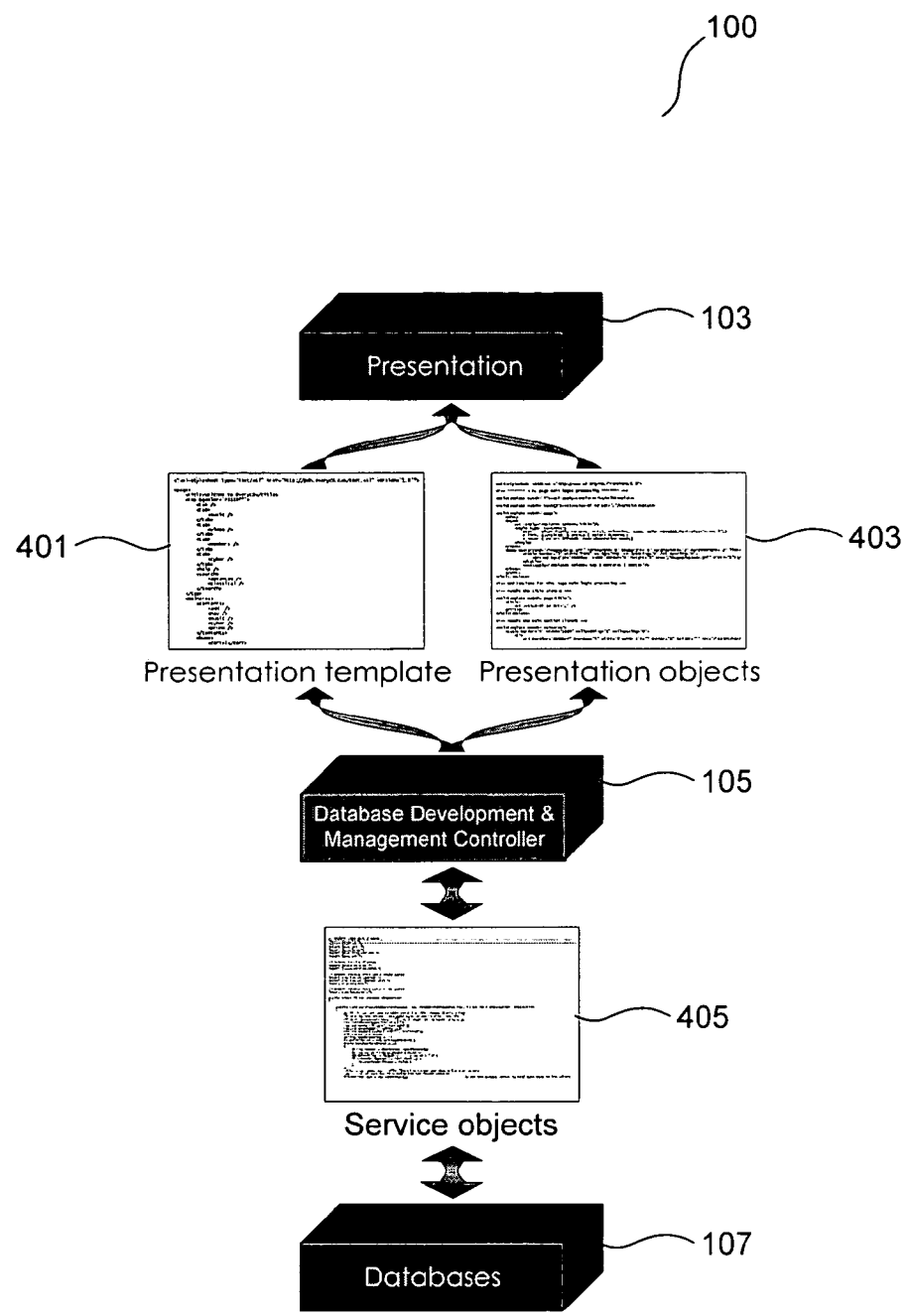
FIG. 4 illustrates an information management system according to another embodiment of the present invention.

FIG. 4 illustrates another embodiment of information management system 100. More specifically, FIG. 4 shows the interaction among presentation application 103, database development and management controller 105, and database management system 107, which collectively support the customization of group-specific interfaces (discussed above). Database development and management controller 105 accesses information collection structures to produce and/or manage a representation of the information stored in database management system 107 (i.e., database records 109(a)–109(n)). Using the information collection structures, database development and management controller 105 permits each client 101(a)–101(n) to customize database management system 107 without having to construct or alter the physical schema of database management system 107. Hence, user customization and security control are not required to be implemented at the database level, but rather via the information collection structures or at a logical level. At the logical level, the information collection structures allow two sub-levels of customization. First, a user can customize the data that are being collected and managed to form a logical database from the physical database records. Second, a user can customize the presentation of the logical database. In other words, each customized logical database can be presented to different user communities in different ways, as established by the information structures. Similarly, each customized presentation format can be used to support different logical databases, as established by the information structures.

In an embodiment, the information collection structures comprise one or more service objects 405, presentation objects 403, and presentation templates 401. As shown, a plurality of service objects 405 are resolved against the information stored in database management system 107 (i.e., database records 109(a)–109(n)) to build a representation of the information as required.

One or more presentation objects 403 are also provided, and one or more service objects 405 are mapped to a presentation object 403. Presentation objects 403 are abstract representations used to organize the display of information, and service objects 405 represent the information stored in a database (i.e., database management system 107 and database records 109(a)–109(n)).

One or more presentation objects 403 are built to support a presentation template 401. Database development and management controller 105 and presentation application 103 work together to customize presentation objects 403, which are displayed by presentation application 103 on client 101(a)–101(n). Each presentation object 403 provides a customized view of the database.

Service objects 405 and presentation objects 403 enable customization to be provided at multiple levels. Service objects 405 customize the information that is collected and managed at a logical level. Presentation objects 403 customize the display of the information collected at the logical level.

Database development and management controller 105 creates a collection of service objects 405 that are used to manage the collection of presentation objects 403 as a single entity. To synchronize the procedural code between the collection of presentation objects 403 and database records 109(a)–109(n) of database management system 107, the presentation application 103 is template or script driven. The template or script integrates the multiple presentation objects 403 on a screen (e.g., client interface 300). Once service and security level customization is mapped to client interface 300, the layout of client interface 300 is substantially static. Therefore a presentation template 401 can be defined to mitigate the need to synchronize the procedural logic. In an embodiment, XML forms the template language. In an embodiment, XML documents are transformed by an Extensible Stylesheet Language (XSL) transformation to create the presentation objects 403, and service objects 405 are Java objects that interface with database development and management application 105.

For the template-based approach shown in FIG. 4, a unique object name space is defined and given to each unique combination of a presentation object 403 with a data source (e.g., service object 405). The unique object name space allows presentation application 103 to map presentation objects 403 to their respective data sources. An advantage of using object name spaces is that it eliminates the need of having to implement a metadata layer that would be used to manage the mapping of presentation object 403 to service object 405.

The present invention includes techniques for enforcing mandatory elements of a presentation object 403 while sustaining the flexibility provided by the template-based approach. In one embodiment, two levels of templates are introduced: a mandatory set and a user-defined set. This general approach, however, may lower system performance and increase code complexity. In a second embodiment, only the optional elements of a presentation object 403 are controlled by a templating process, and the mandatory elements are driven out of a database (i.e., database management system 107, etc.) or are hard-coded within presentation application 103. This approach exploits the existence of well-defined methods for managing data within a database.

In a third embodiment, a middle layer of code is developed to enforce the display of mandatory elements of presentation objects 403 and handle the optional generation of other elements. This approach is particularly effective if mandatory elements are handled by template management process. That is, the mandatory elements should automatically fall out of any template specification as part of the process of rendering the template. To support this embodiment, the object name space should capture the semantics of mandatory and optional elements.

The templates can be driven out of a database (such as, database management system 107, database records 109(*a*)–109(*n*), etc.) or out of a file system. In an embodiment, the templates are managed as binary large objects (BLOBs) and stored in a database or file system. In another embodiment, the templates are managed as parsed entities. A tool can be used to parse, build, and manage templates from the discrete components.

In an embodiment, the templates are converted from BLOBs to discrete components within a template. In an embodiment, the templates are built from discrete objects within the database. The templates are built each time they are referenced. In another embodiment, the templates are parsed into discrete objects for manipulation by presentation application 103. This approach may improve system performance since templates are not being built at each time of reference, but may be more error prone.

As discussed above, system 100 enables a single database (e.g., database management system 107 and database records 109(*a*)–109(*n*)) to be shared among multiple services. As such, system 100 accommodates different views of the same data for different services. The entities within the shared database are generalized canonical representations, which allow the creation of "super" entities that contain all possible fields that any service would require. In an embodiment, data is stored in a denormalized fashion within the shared database. Denormalized tables improve system performance, but may impose extra storage costs.

Figure 5:
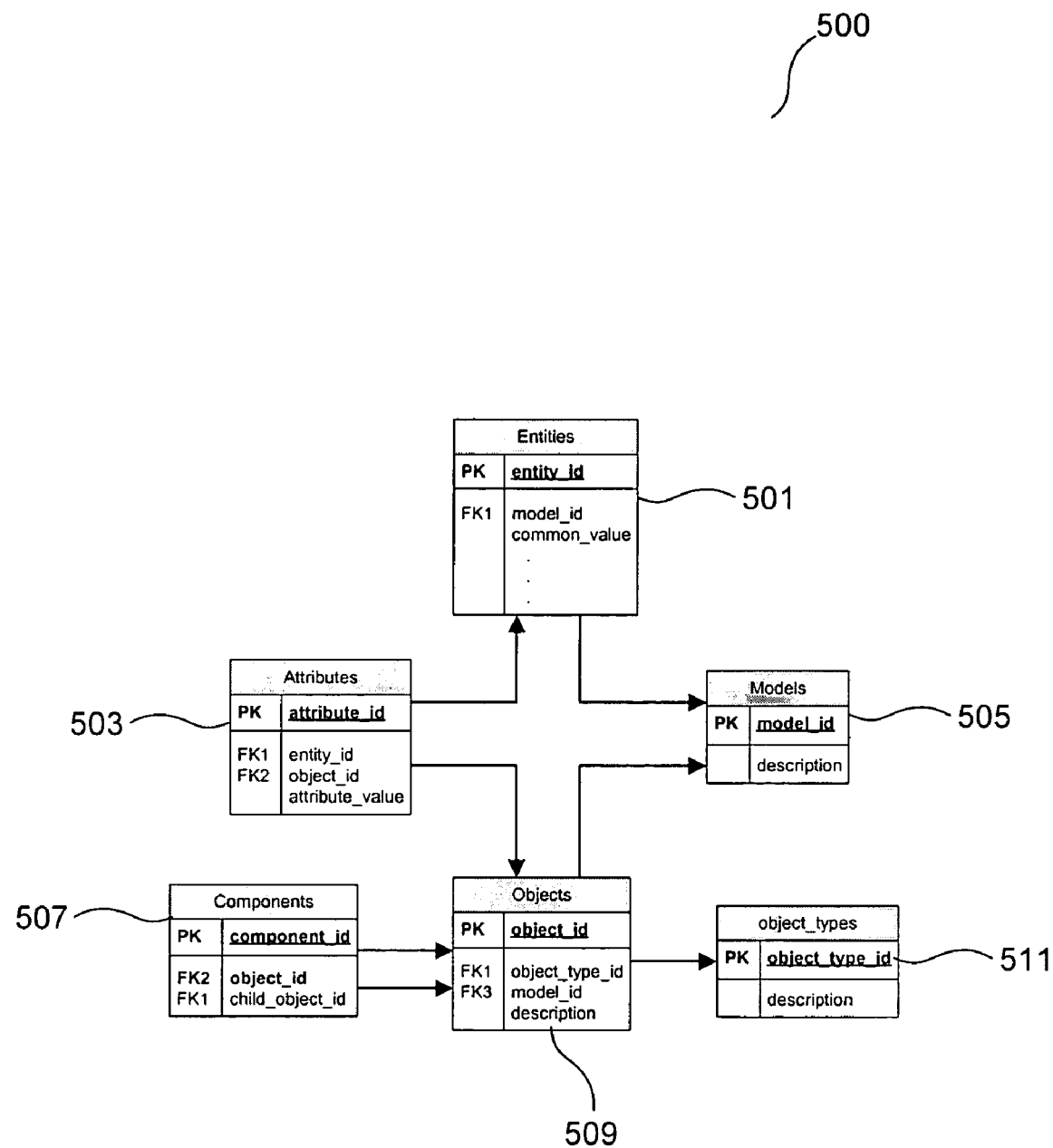
FIG. 5 illustrates a database entity model according to an embodiment of the present invention.

To support multiple services, system 100 uses metadata to manage the general entities of the shared database. Metadata determines the fields that a given service must maintain. Metadata also allows multiple services to refer to the same data in different ways. FIG. 5 illustrates a representative embodiment of a database entity model 500, which can be used to manage database entities that require a high degree of customization. Entity model 500 includes an entities table 501, attributes table 503, models table 505, components table 507, objects table 509, and object types table 511.

The actual data for entity model 500 is stored in entities table 501 and attributes table 503. Entities table 501 contains the data that is common across all instances of entity model 500, and serves as the parent for variable data. As discussed above, in an embodiment, database management system 107 can be used to collect clinical research data, and an exemplary database record 109 collects therapies information. A therapies database record 109 may include such fields as "start_date" and "end_date".

Attributes table 503 contains model-specific attribute values for an entity. For example, if a database record 109 collects information related to organ transplants, all information about specific matches would be stored in attributes table 503.

Models table 505, components table 507, objects table 509, and object types table 511 contain metadata for entity model 500. Models table 505 represents an instance of an entity being modeled. For example, if entities table 501 collects information pertaining to therapies, a model table 505 can be produced to collect information pertaining to transplants.

Objects table 509 represents the dynamic data that is to be captured for a given model table 505. For example, for a transplants model table 505, objects table 509 can include matches. In other words, object table 509 would capture information about transplant matches.

Object types table 511 describes how to display and manage the general object. For example, for a matches objects table 509, object types table 511 can indicate that the data is simple text. Object types table 511 represents valid object classes that are responsible for handling the particular data associated with object table 509.

Components table 507 allows complex components to be created for a hierarchy of objects. For example, for a transplants model table 505, there may be a "transplant_infusion" object table 509 (with a type of container), which in turn contains multiple other object tables 509. In an embodiment, a relationship type is added to components table 507 to allow object tables 509 to be related to each other in multiple ways.

Figure 6:
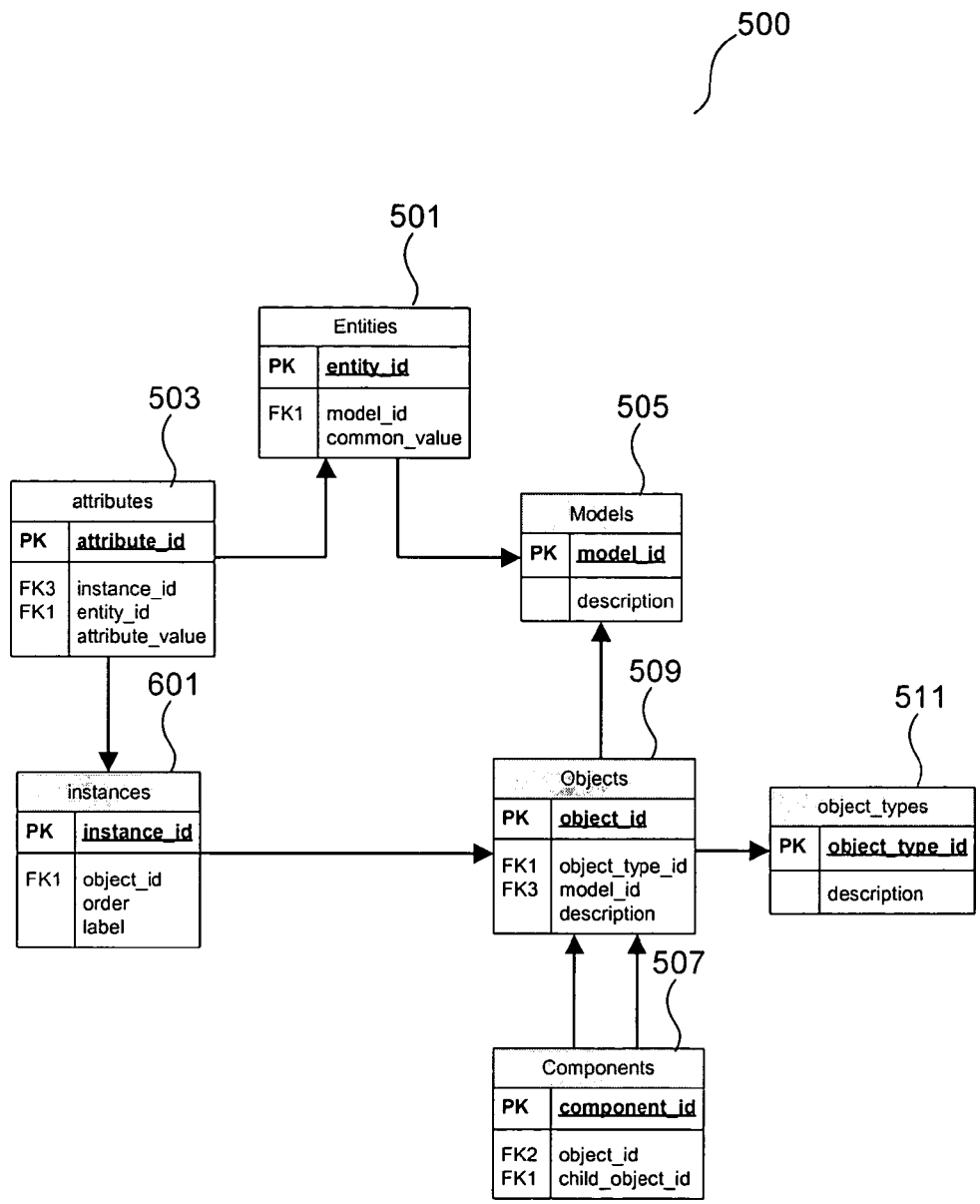
FIG. 6 illustrates a database entity model according to another embodiment of the present invention.

FIG. 6 illustrates another embodiment of an entity model 500, which allow each service to customize the presentation of objects. As discussed with reference to FIG. 4, presentation templates 401 enable interface customization of a shared database. However, FIG. 6 shows an entity relationship that reflects the customization within a shared database. Referring to FIG. 6, an instances table 601 is included. Instances table 601 allows instance-specific metadata to be captured for the object tables 509 in entity model 500. Instance-specific metadata includes instance-specific labeling of the object tables 509 and instance-specific ordering of the objects tables 509. If templates (e.g., presentation template 401) are used, instances table 601 should not be required since instance-specific data would be captured in the template.

According to embodiments of the present invention, the object model shown in FIG. 8 can be mapped to the general entity model 500 shown in FIG. 6. In particular, a single instance of entity model 500 can be implemented to manage all data on a particular inheritance chain. For example, an entity model 500 implementing observations (such as, observation object 810 in FIG. 8) could potentially also be used to capture adverse events (such as, adverse event object 824 in FIG. 8).

Figure 9:
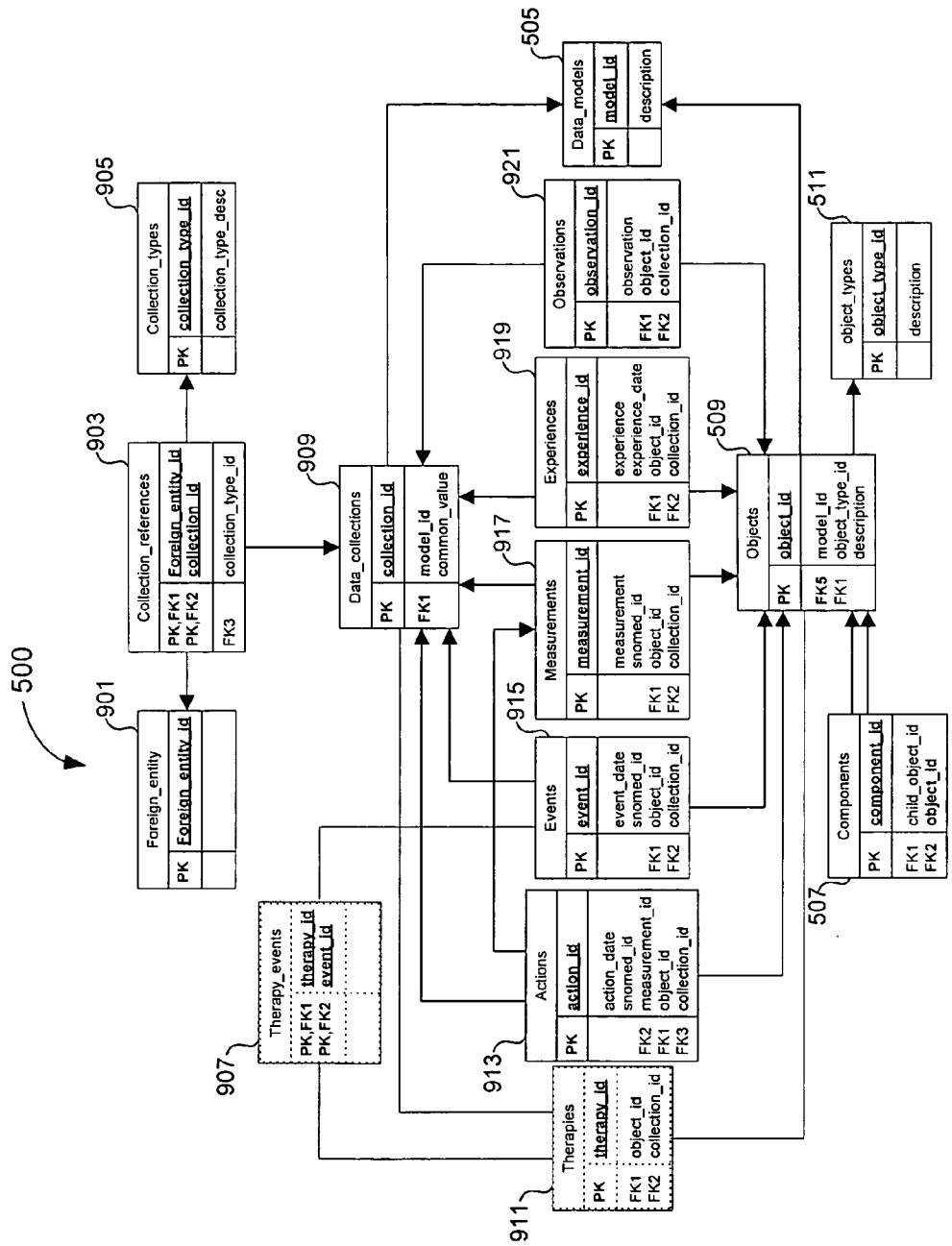
FIG. 9 illustrates a database entity model according to another embodiment of the present invention.
Figure 10A:
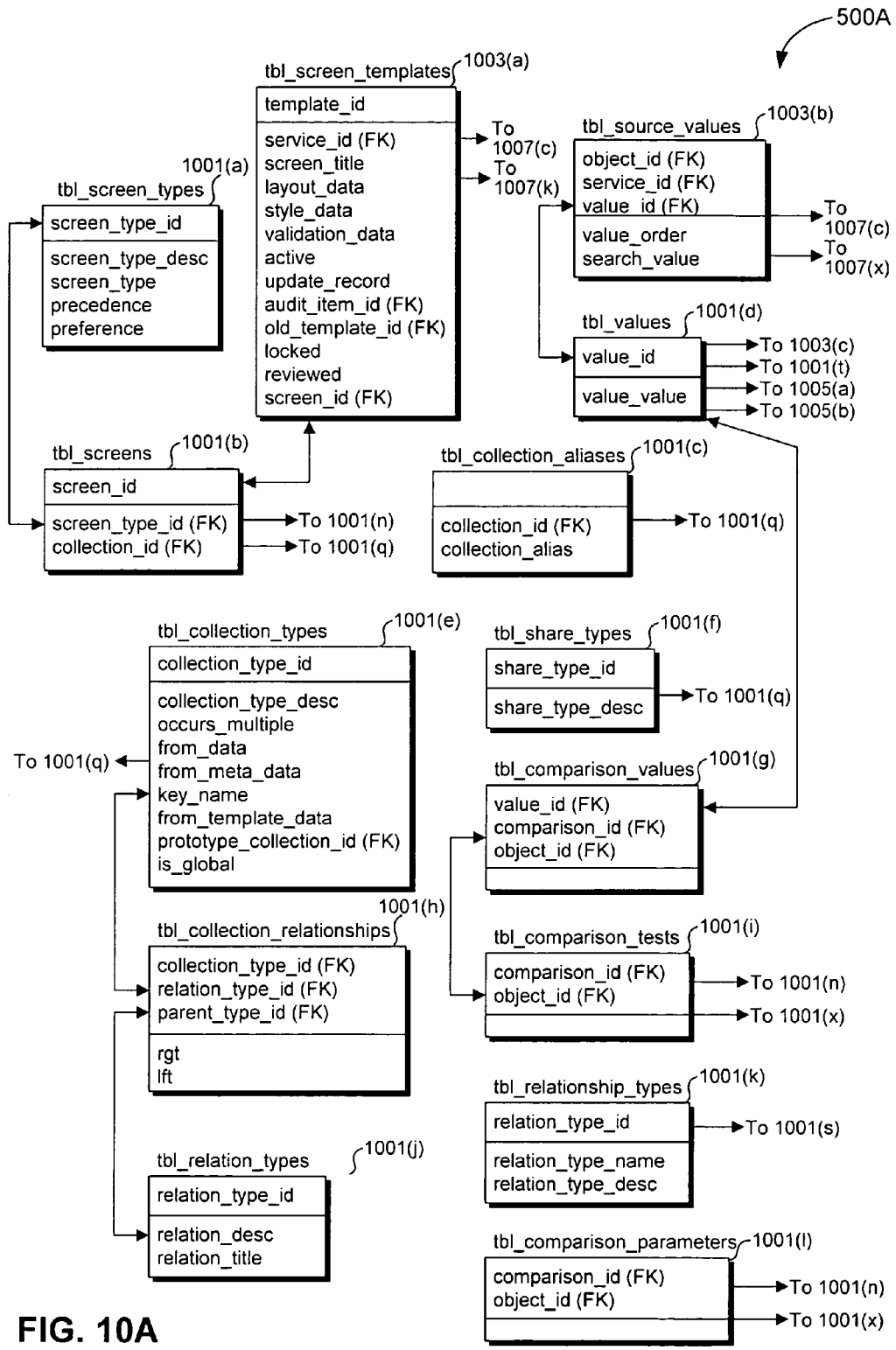
FIGS. 10A–10F illustrate a database entity model according to another embodiment of the present invention.
Figure 10B:
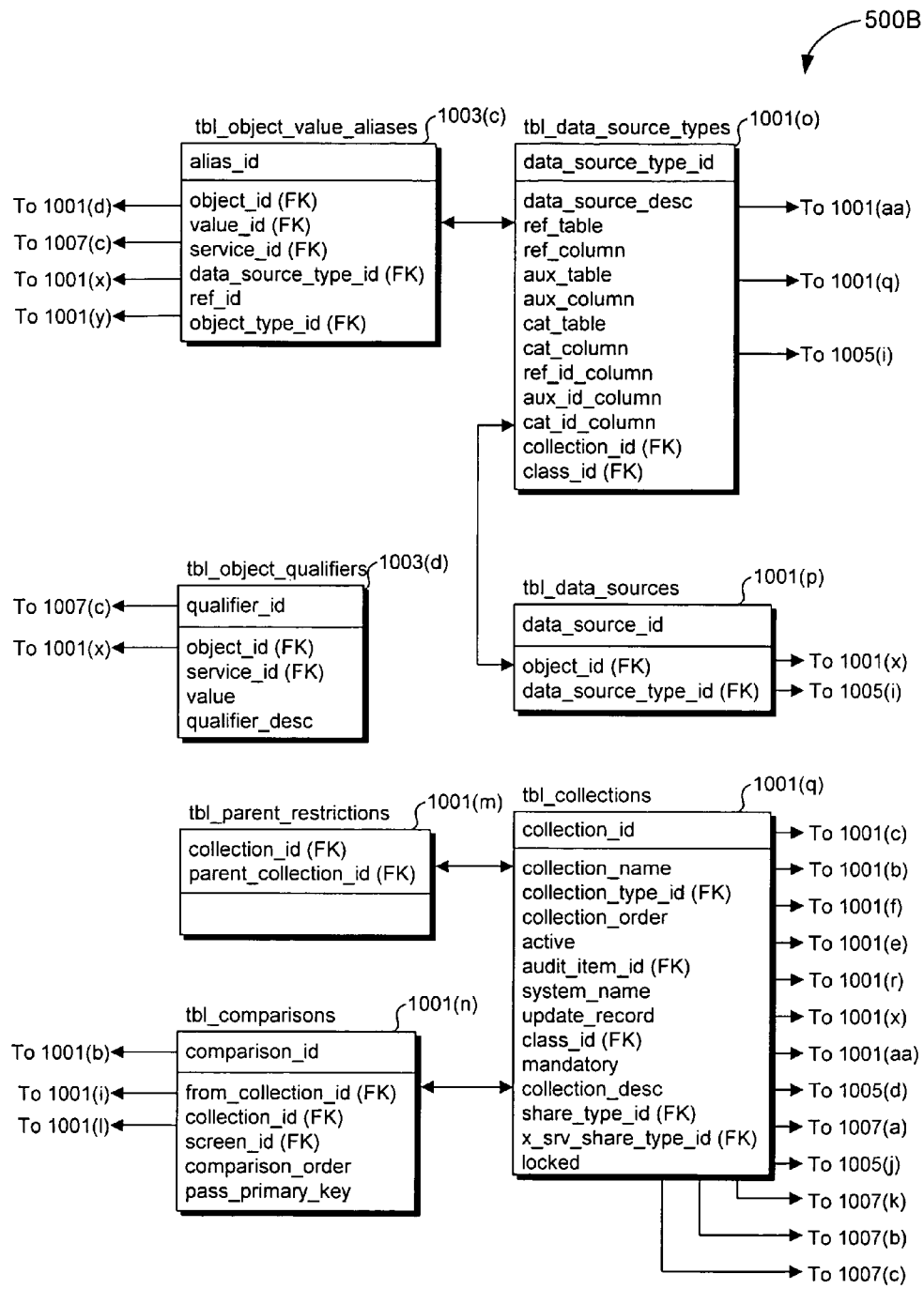
Figure 10C:
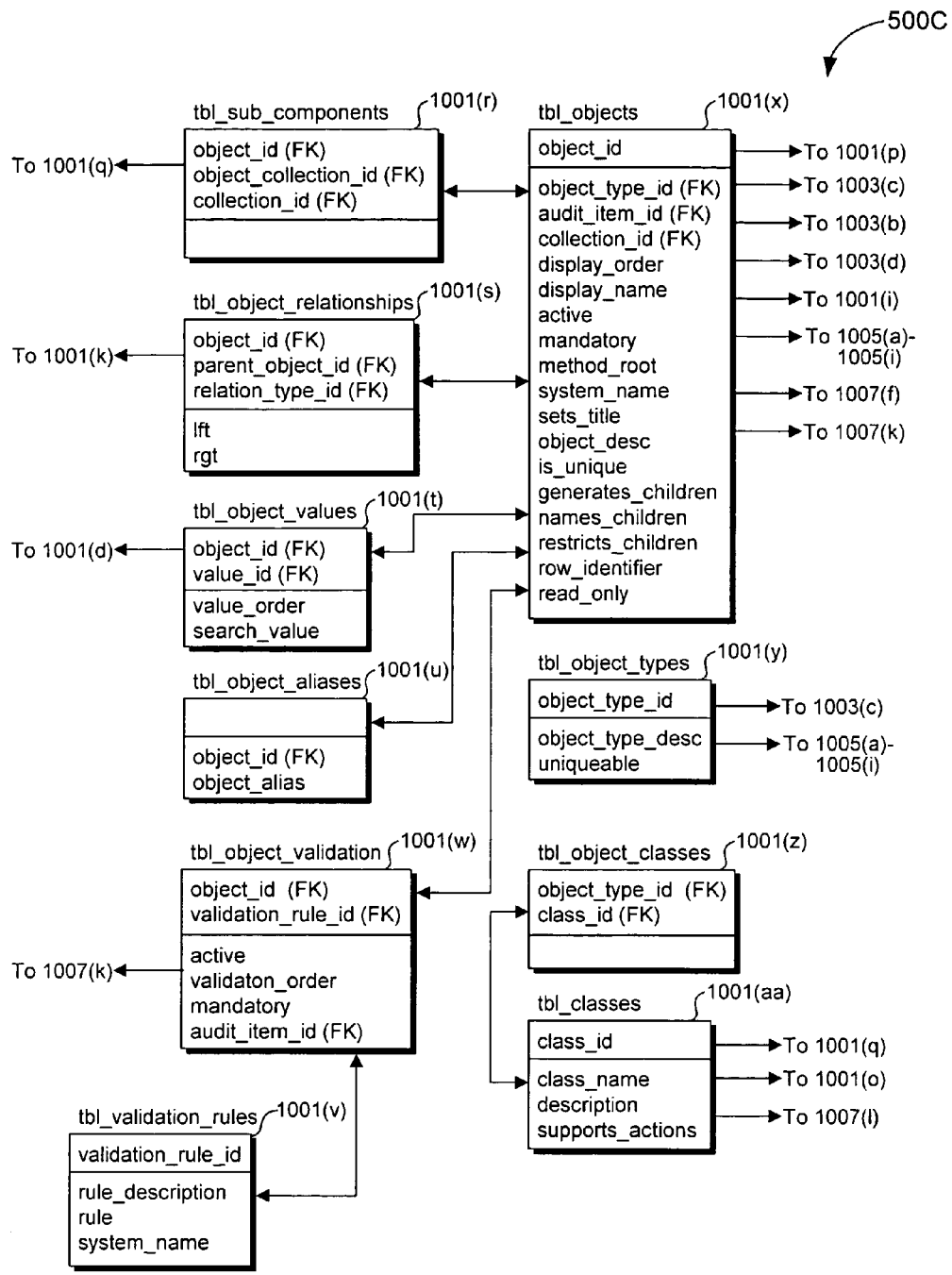
Figure 10D:
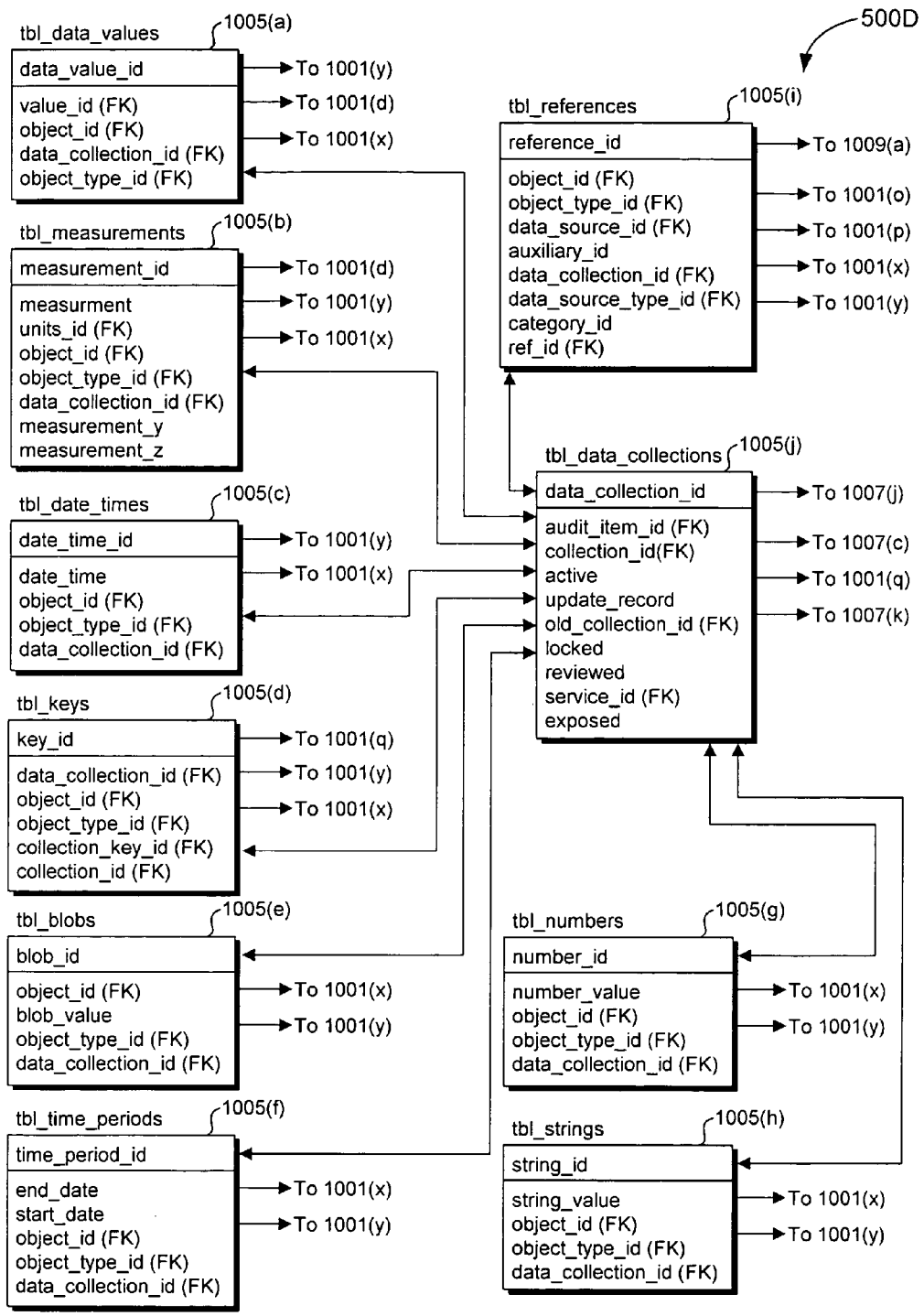
Figure 10E:
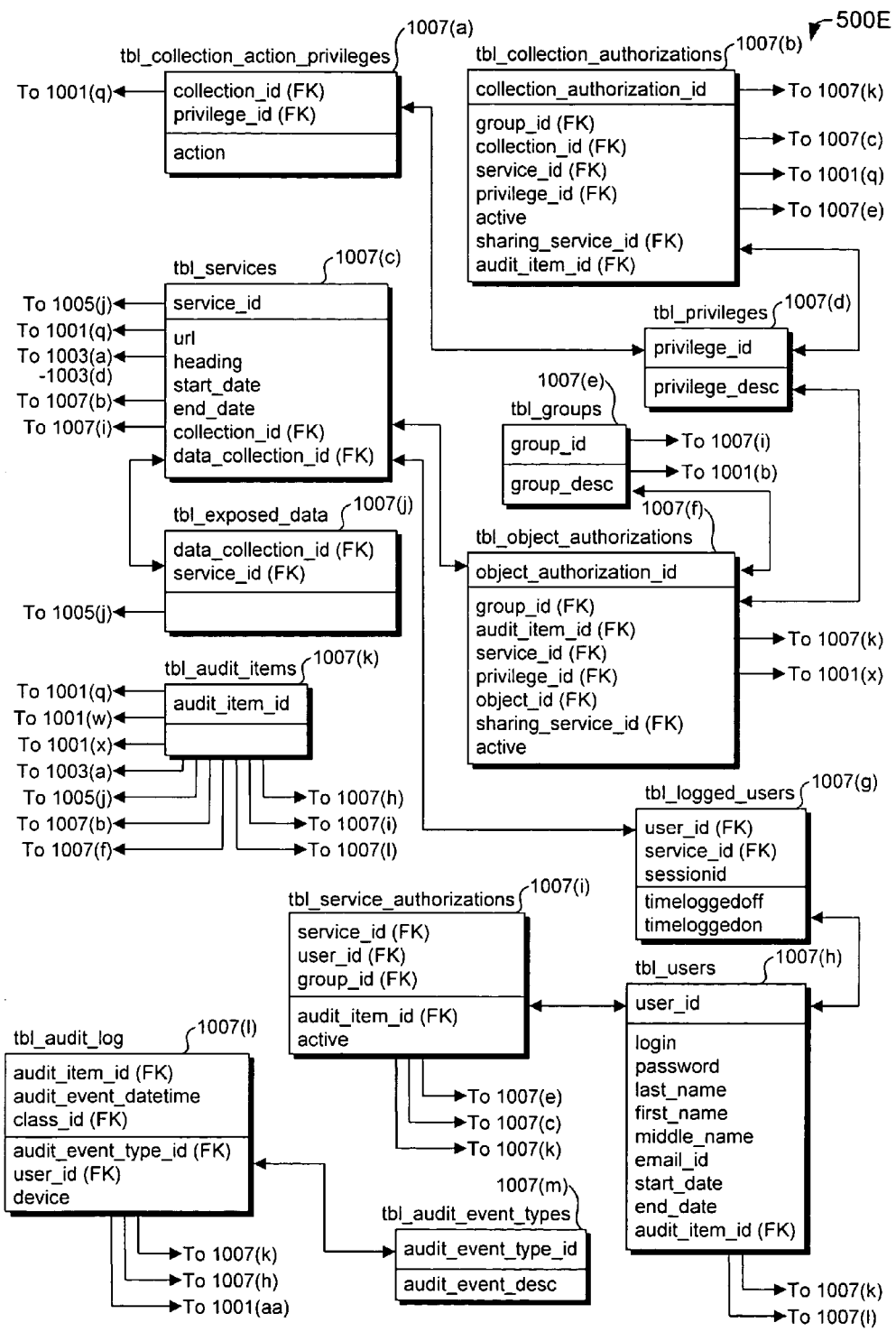
Figure 10F:
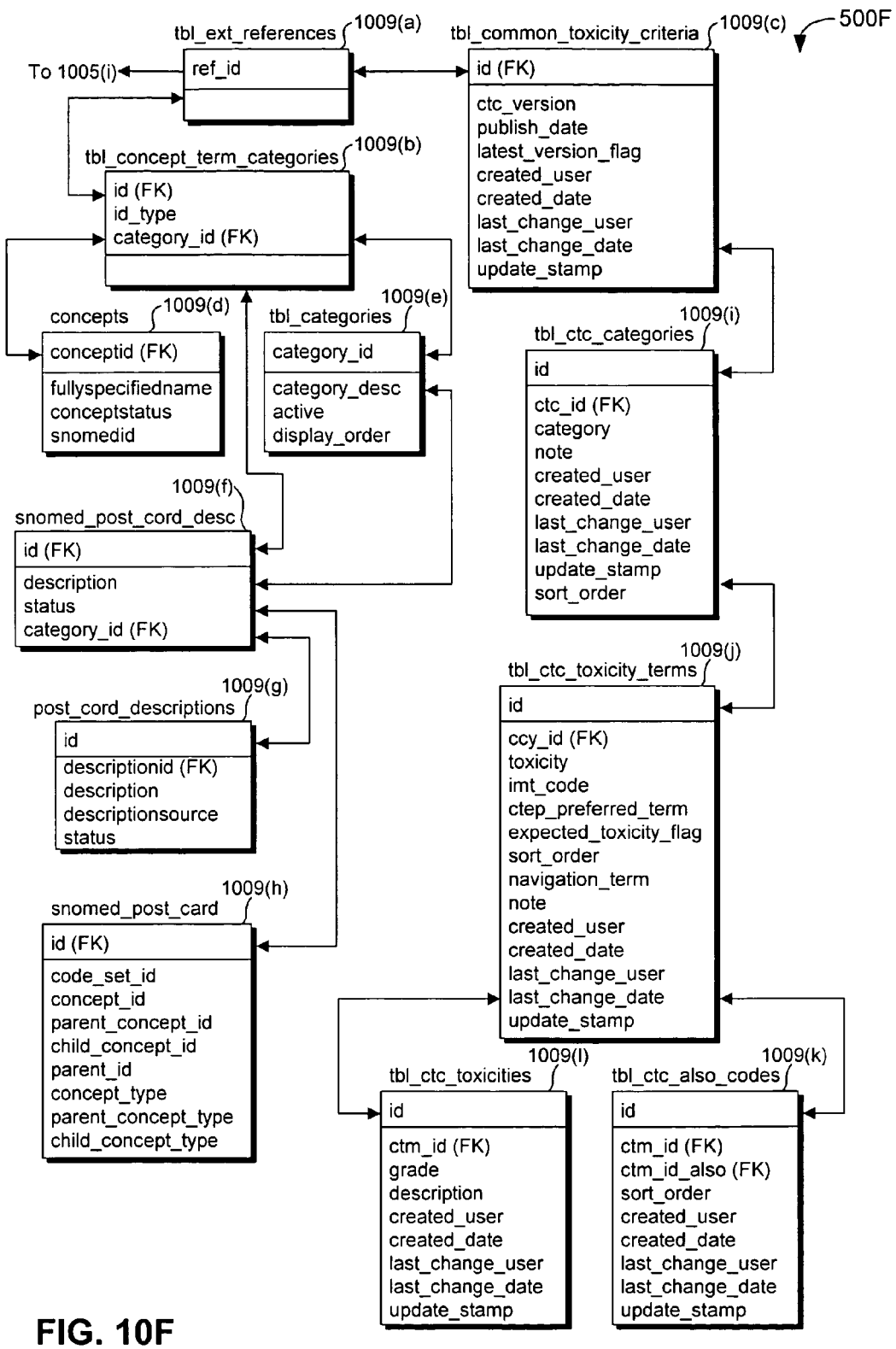

FIG. 9 illustrates another embodiment of entity model 500, which includes different types of collection tables that correspond to differing collection classes. The entity model 500 includes a foreign entity table 901, collection references table 903, collection types table 905, therapy events table 907, data collections table 909, therapies table 911, actions table 913, events table 915, measurements table 917, experiences table 919, observations table 921, "data" models table 505, objects table 509, components table 507, and object types table 511.

In FIG. 9, the metadata contained in entity model 500 is used to define a collection type (stored in collection types table 905) to specify which collection table to use. This embodiment of entity model 500 does not separate out the data by type, and the collection type can be propagated throughout the entire entity model 500 as a foreign key (e.g., FK3). The foreign key allows direct selection of the data from each table by storing entity type and allows physical performance optimizations based on indexing and partitioning based on the foreign key. If the underlying database (i.e., database management system 107 and database records 109(*a*)–109(*n*)) does not implement true outside join support, subrogate keys and constraints are used on the collection type as the foreign key.

In FIG. 9, entity model 500 also includes therapies (stored in therapies table 911) as an example of a collection type that specializes the general model 500. In FIG. 9, the aggregation shown in FIG. 8 is broken out via a many-to-many relationship between the therapies collection (shown as therapies table 911) and the events collection (shown as therapy events table 907). This same pattern could be used to implement other aggregating entities to provide a compact data model that separates out the important data. Aggregation entities are effective if the entities that are represented as separate collection data types are, themselves, aggregated by some other entity. For example, referring back to FIG. 8, both protocol object 806 and diagnosis object 804 aggregate treatment/therapy object 808. If the collection class is not itself aggregated, or if it does not require any customization when it is aggregated, then the entity is implemented as a foreign entity that uses the generalized entity model 500.

In an embodiment, database constraints are used to ensure that a propagated collection type is enforced on each aggregating table. In another embodiment, the aggregating tables represent GUI primitives ensuring that, for any display object, all data is aggregated in a single place. The object model classes exist only in the metadata surrounding the tables and/or in the views.

Referring back to FIG. 9, the foreign entity table 901 and collection references table 903 are non-specific references to tables that will vary for each usage of the generalized collection represented by entity model 500. For example, the foreign entity table 901 can be the "diagnosis" table for diagnosis object 804 from FIG. 8, and the collection reference table 903 might be named the "diagnosis_data" table for the data stored at diagnosis object 804.

As shown, the collection reference table 903 includes a collection type identifier, which serves as a key to the collection types table 905. This allows a single entity to reference multiple collections in a normalized fashion. For example, consider protocols referencing both clinical events (such as, clinical events 836) and adverse events (such as, adverse events 824). In such a case, the foreign entity table 901 can be the protocols table (for protocol object 806), and the collection references table 903 can be named the "protocol_data" table for the data stored at protocol object 806. The resultant protocol data can have a type of either "adverse event" or "clinical event" and different data collections would aggregate the data for these two collection types.

FIGS. 10A–10F illustrate another embodiment of an entity model 500 (shown as 500A–500F), which allows each service to customize the presentation of objects. Additionally, FIGS. 10A–10F show a schema for clinical research information, such as the clinical research objects described with reference to FIG. 8, above. The schema, which is depicted in entity model 500A–500F, is divided into four main areas. First, tables 1001(*a*)–1001(*aa*) and 1003(*a*)–1003(*d*) manage the metadata for system 100 and implement the collection models. Tables 1001(*a*)–1001(*aa*) represent system-wide metadata. Tables 1003(*a*)–1003(*d*) represent service-specific metadata.

The second main area of the schema includes tables 1005(*a*)–1005(*j*). Tables 1005(*a*)–1005(*j*) collect the collections data.

The third main area includes tables 1007(*a*)–1007(*m*). Tables 1007(*a*)–1007(*j*) maintain security information, and tables 1007(*k*)–1007(*m*) maintain audit trail information.

The fourth main area includes tables 1009(*a*)–1009(*l*). Tables 1009(*a*)–1009(*l*) maintain terminology information for system-wide and service-specific applications.

The entity model 500A–500F shown in FIGS. 10A–10F includes two main tables that make up the collections entities. The first main table is collections table 1001(*a*), which defines the collection (for example, "Chemotherapy"). The second main table is objects table 1001(*x*), which defines the data collected. Collection aliases table 1001(*c*), object aliases table 1001(*u*), and object value aliases table 1003(*c*) maintains alias information for the collection entities.

Collection relationships table 1001(*h*), relationship types table 1001(*k*), object relationships table 1001(*s*), and parent restrictions table 1001(*m*) give hierarchy to the collection types and can be used to define menu structures. Collection types table 1001(*e*) define the type of collection (for example, "Therapy").

Sub components table 1001(*r*) define hierarchy for objects, and can be used for grids or any other organization that requires grouping. Collections are treated as objects in order to define hierarchy.

Object validation table 1001(*w*) and validation rules table 1001(*v*) define the possible spectrum of validation rules that can be applied to a given object. Data sources table 1001(*p*) and data source types table 1001(*o*) define addresses or links for selecting values for a given object (for example, in a clinical trials environment, a Snomed, or a particular Milli table, such as tables 1009(*a*)–1009(*l*)).

Object values table 1001(*t*), source values table 1003(*b*), and values table 1001(*d*) maintain values that are not sourced from external tables that are not free form. The values from these tables are often used as list box data sources.

Object qualifiers table 1003(*d*) enables a user to provide value normalization when differing implementations of the same concept is used to collect the same data in differing ways. For example, in a clinical trials environment, if the standard for radiation is "cGy" and one group of users intend to use "Gy", then the description would give the fixed units and the value would be the multiplier used to convert back to the standard (in this case 0.01).

Object classes table 1001(*z*) map the class implementation used for a specific object. For example, table 1001(*z*) can be used to map a specific collection to a Java class.

Screens table 1001(*b*) and screen types table 1001(*a*) identify the templates that make up a screen. These tables also define the screen function the screen by type, and identify the collections used to compose the template.

Classes table 1001(*aa*) maintains the actual Java classes used to implement the objects. Comparisons table 1001(*n*), comparison values table 1001(*g*), comparison tests table 1001(*i*), and comparison parameters table 1001(*l*) provide ways to generically link one collection to another, to link an object to a collection, and/or to associate an action with the collection or object. These tables allow the value of an object to be compared to a reference value (e.g., static, or in another collection), and allow an action to be selected based on the results of the comparison.

Screen templates table 1003(*a*) contains the actual unparsed templates (e.g., XML templates) used to create the screens or graphical user interfaces of the present invention. Table 1003(*a*) is related to specific collections and describes how a given collection should be rendered on the screen.

Collection types table 1001(*e*) and object types table 1001(*y*) are candidates for contributing primary keys for the metadata tables. If the underlying database (i.e., database management system 107 and database records 109(*a*)–109(*n*)) does not support true outer joins, collection types table 1001(*e*) and object types table 1001(*y*) are implemented as foreign keys to the metadata tables, and the candidate contributing and constraints are defined on the referencing tables to enforce the required relationships.

The main data collection entity is the data collections table 1005(*j*). A row is created within table 1005() for every change to tables 1005(*a*)–1005(*i*). Tables 1005(*a*)–1005(*i*) contain the actual data for the data collection entity. For instance, strings table 1005(*h*) maintains simple character data that has no other well-defined structure. Numbers table 1005(*g*) maintains simple numeric data. Date times table 1005(*c*) maintains exact date times. Blobs table 1005(*e*) maintains the collection of image data and other larger binary data. Time periods table 1005(*f*) maintains dates and times over a range of time. The range of time can be either a start and end date, or a "fuzzy" date where the exact period is not known. In cases where a fuzzy start and fuzzy end date is required, two instances of table 1005(*f*) are used to collect the data.

References table 1005(*i*) maintain qualified references to lists or external data sources. For some external references, it may be required to track composite keys and other columns may be required in table 1005(*i*).

Measurements table 1005(*b*) maintain quantified values. The values and the units can be derived from external sources, and other columns can be added to table 1005(*b*) to assist in tracking such sources.

Data values table 1005(*a*) maintain tracks values selected from a system-defined list, as opposed to external sources. Keys table 1005(*d*) defines foreign key relationships within a collection to another collection.

The data collections table 1005(*j*) includes three non-key values that show up repeatedly in entity model 500A–500F. The three non-key values are shown in FIGS. 10A–10F as "active," "update record," and "audit item id." The "active" value indicates that an instance of the collection data is currently active or not. In an embodiment, records are never deleted from system 100. As such, the "active" value is helpful in providing a way to determine which data is actually in use.

The second value is "update record," which indicates that an instance of the collection data is an update to a previously defined record. The previously defined record is no longer marked active.

The third value is "audit item id." The "audit item id" is a foreign key reference to the audit logs. In an embodiment, every table in model 500A–500F that is auditable has a foreign key relationship to itself. This key has the same or similar name to the primary key prefixed with "old_". When a new item is inserted into a table as an update record, the new record points to the original record using this key. This allows foreign key relationships to the original record to be maintained. However, joins against the table are made to the "old" column that is currently marked active.

The audit logs are structured by audit items table 1007(*k*), audit log table 1007(*l*), and audit event types table 1007(*m*). For audit items table 1007(*k*), a single entry is added to this table every time an auditable item is inserted into system 100. To avoid creating many-to-many mapping tables to the audit logs to every auditable table, audit items table 1007(*k*) provides an ownership role for auditable items.

Every time an auditable event is made to an auditable item, an entry is made in audit log table 1007(*l*). When a record is updated, the current record is marked inactive and a new record is inserted into audit log table 1007(*l*). The new record uses the same "audit item id" value as the original record, thus tying all related records together.

Audit event types table 1007(*m*) indicates the actions of insertion, update, and/or deletion. In an embodiment, audit event types table 1007(*m*) indicates the action of performing an audit, itself.

System security is structured by the collection action privileges table 1007(*a*), collection authorizations table 1007(*b*), services table 1007(*c*), privileges table 1007(*d*), groups tables 1007(*e*), object authorizations table 1007(*f*), logged users table 1007(*g*), users table 1007(*h*), service authorizations table 1007(*i*), and exposed data table 1007(*j*), as discussed herein. Exposed data table 1007(*j*) includes foreign keys to maintain the relationship between data collections table 1005(*j*) and services table 1007(*c*).

Service authorizations table 1007(*i*) is able to audit actions taken on it and is able to track old data. Shares types table 1001(*f*), collection action privileges table 1007(*a*), collection authorizations table 1007(*b*), privileges table 1007(*d*), and object authorizations table 1007(*f*) provide a way for services to selectively share data with other services. Any service can define a share-level authorization on a collection or object with another service. This allows the other service to view data entered for that collection or object with the authorizations as defined by the sharing service. Thus, the present invention supports normal and shared authorization types.

FIGS. 1–6, 8, 9, and 10A–10F are conceptual illustrations facilitating explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 7:
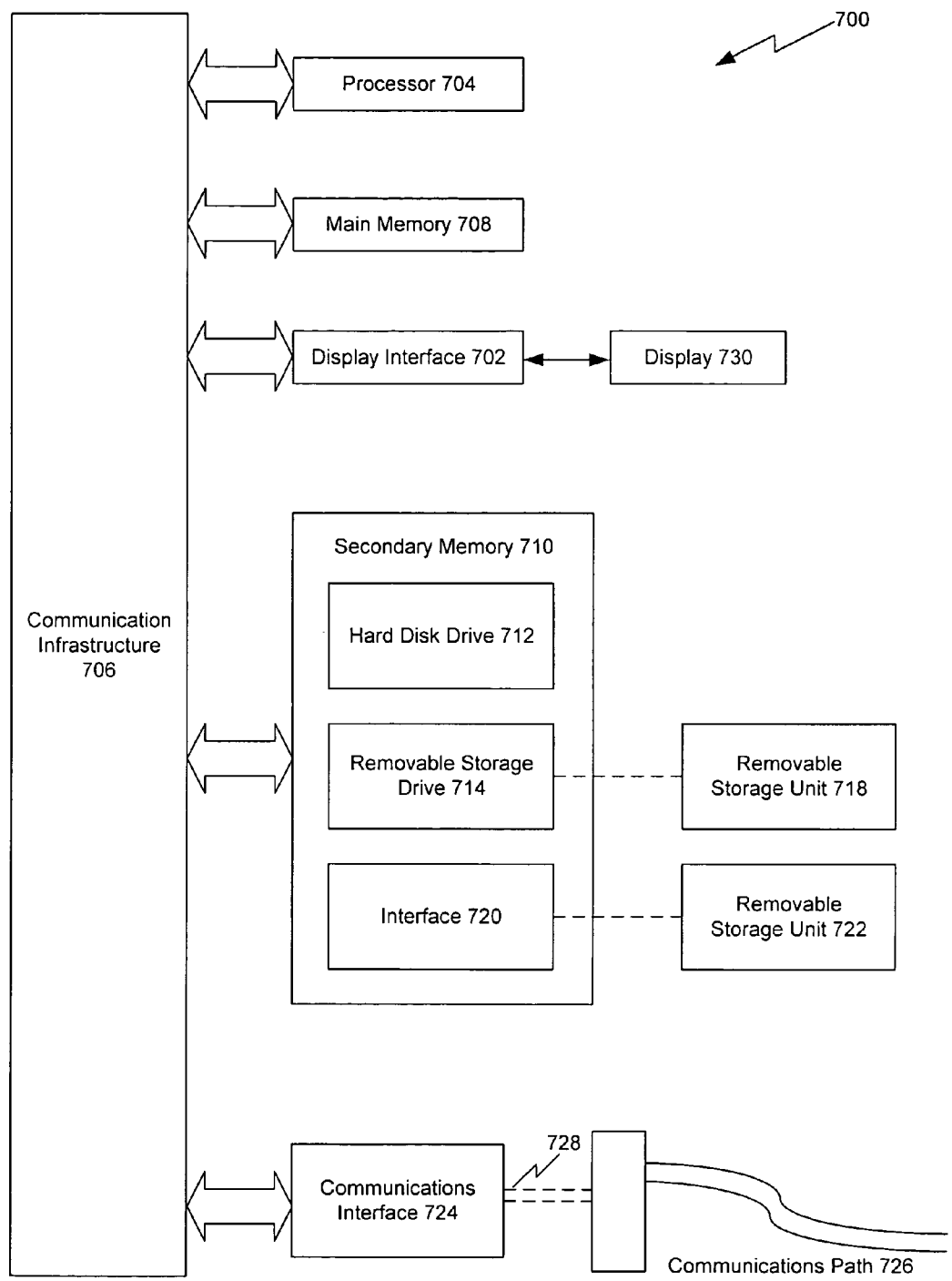
FIG. 7 illustrates an example computer system useful for implementing portions of the present invention.

The present invention can be implemented in one or more computer systems capable of carrying out the functionality described herein. Referring to FIG. 7, an example computer system 700 useful in implementing the present invention is shown. Various embodiments of the invention are described in terms of this example computer system 700. After reading this description, it will become apparent to one skilled in the relevant art(s) how to implement the invention using other computer systems and/or computer architectures.

The computer system 700 includes one or more processors, such as processor 704. The processor 704 is connected to a communication infrastructure 706 (e.g., a communications bus, crossover bar, or network). Various software embodiments are described in terms of this exemplary computer system. After reading this description, it will become apparent to one skilled in the relevant art(s) how to implement the invention using other computer systems and/or computer architectures.

Computer system 700 can include a display interface 702 that forwards graphics, text, and other data from the communication infrastructure 706 (or from a frame buffer) for display on the display unit 730.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to removable storage drive 714. As will be appreciated, the removable storage unit 718 includes a computer usable storage medium having stored therein computer software (e.g., programs or other instructions) and/or data.

In alternative embodiments, secondary memory 710 can include other similar means for allowing computer software and/or data to be loaded into computer system 700. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 can also include a communications interface 724. Communications interface 724 allows software and data to be transferred between computer system 700 and external devices. Examples of communications interface 724 can include a modem, a network interface (such as an Ethernet card), a communications port, a PCM-CIA slot and card, etc. Software and data transferred via communications interface 724 are in the form of signals 728 which can be electronic, electromagnetic, optical, or other signals capable of being received by communications interface 724. These signals 728 are provided to communications interface 724 via a communications path (i.e., channel) 726. Communications path 726 carries signals 728 and can be implemented using wire or cable, fiber optics, a phone line, a cellular phone link, an RF link, and other communications channels.

In this document, the terms "computer program medium" and "computer usable medium" are used to generally refer to media such as removable storage unit 718, removable storage unit 722, a hard disk installed in hard disk drive 712, and signals 728. These computer program products are means for providing software to computer system 700. The invention is directed to such computer program products.

Computer programs (also called computer control logic or computer readable program code) are stored in main memory 708 and/or secondary memory 710. Computer programs can also be received via communications interface 724. Such computer programs, when executed, enable the computer system 700 to implement the present invention as discussed herein. In particular, the computer programs, when executed, enable the processor 704 to implement the processes of the present invention, such as the method(s) implemented using various components of system 100 described above. Accordingly, such computer programs represent controllers of the computer system 700.

In an embodiment where the invention is implemented using software, the software can be stored in a computer program product and loaded into computer system 700 using removable storage drive 714, hard drive 712, interface 720, or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

The foregoing description of the specific embodiments will so fully reveal the general nature of the invention that others can, by applying knowledge within the skill of the art (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the art.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method of defining and collecting data in an information management system, comprising:
   creating a plurality of information collection structures to produce a representation of a shared database;
   receiving a read request or a write request from a user interface; and
   accessing said representation to execute said read request or said write request without having to access said shared database,
   wherein the plurality of information collection structures comprises a presentation object and a service object, wherein the service object customizes information in the shared database and the presentation object customizes display of the information.

2. The method according to claim 1, further comprising:
   creating a plurality of representations of said shared database from said information collection structures.

3. The method according to claim 2, further comprising:
   customizing each of said plurality of representations to a specific user group without altering a physical structure of said shared database.

4. The method according to claim 3, wherein said customizing step comprises:
   collecting a new type of data currently defined within said shared database.

5. The method according to claim 3, wherein said customizing step comprises:
   collecting a new type of data not currently defined within said shared database.

6. The method according to claim 3, wherein said customizing step comprises:
   providing metadata from said information collection structures to customize a view of said database.

7. The method according to claim 1, wherein said creating step comprises:
   providing metadata to transpose said representation to said shared database and said user interface.

8. The method according to claim 1, wherein said creating step comprises:
providing metadata to manage general entities.

9. The method according to claim 1, wherein said creating step comprises:
providing a plurality of generic objects for said information collection structure, wherein each of said generic objects includes the presentation object.

10. The method according to claim 9, wherein said creating step further comprises:
defining a unique object name space for each of said generic objects, said unique object name space having a unique name for a unique combination of a presentation object with a data source from said shared database.

11. A method of defining and collecting data in an information management system, comprising:
creating information collection structures to manage a database at a logical level;
receiving a request from a user interface for a customized view of said database; and
producing said customized view without altering a physical structure of said database,
wherein the information collection structures comprise a presentation object and a service object, wherein the service object customizes information in the shared database and the presentation object customizes display of the information.

12. An information management system, comprising:
a database comprising a plurality of integrated records;
a plurality of information collection structures for producing a representation of said database; and
a user-interface for enabling submission of a read request or a write request to said representation, wherein said information collection structures execute said read request or said write request without having to access said integrated records,
wherein the plurality of information collection structures comprises a presentation object and a service object, wherein the service object customizes information in the shared database and the presentation object customizes display of the information.

13. The system of claim 12, wherein said information collection structures produce a plurality of representations of said database, wherein each of said plurality of representations is customized for a specific user group without altering a physical structure of said database.

14. The system of claim 12, wherein said information collection structures comprise a generic object or a generalized algorithm.

15. The system of claim 14, wherein said database drives said generic object or said generalized algorithm to support said read request or said write request.

16. The system of claim 14, wherein an XML template drives said generic object or said generalized algorithm to support said read request or said write request.

17. The system of claim 14, wherein said user interface comprises a template associated with said generic object or said generalized algorithm.

18. The system of claim 12, wherein said user interface is script driven.

19. The system of claim 12, wherein said information collection structures comprise a plurality of generic objects, wherein each of said plurality of generic objects includes one or more presentation objects.

20. The system of claim 19, wherein each of said plurality of generic objects is associated with a unique object name for a unique combination of the presentation object with a data source from said database.

21. The system of claim 12, wherein said integrated records comprise clinical research information.

22. The system of claim 12, wherein said integrated records comprise at least one of patient information, protocol information, therapy information, and clinical results.

23. The system of claim 12, further comprising:
a security mechanism for controlling access to said database.

24. The system of claim 12, further comprising:
a security mechanism for controlling access to said information collection structures.

25. An information management system, comprising:
a database;
a shared application infrastructure for structuring said database at a logical level using a service object; and
a user-interface for presenting data from said database, wherein said shared application infrastructure produces a customized view of said database using a presentation object, wherein the service object customizes information in the shared database.

26. A method of defining and collecting clinical research information in an information management system, comprising:
creating a plurality of information collection structures to produce a representation of a shared database;
receiving a read request or a write request for clinical research information from a user interface; and
accessing said representation to execute said read request or said write request without having to access said shared database,
wherein the plurality of information collection structures comprises a presentation object and a service object, wherein the service object customizes information in the shared database and the presentation object customizes display of the information.

* * * * *